(12) United States Patent
Jiang

(10) Patent No.: US 7,904,925 B2
(45) Date of Patent: Mar. 8, 2011

(54) SYSTEM, METHOD AND DEVICE FOR REALIZING MULTIMEDIA SERVICE

(75) Inventor: Yong Jiang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/634,328

(22) Filed: Dec. 9, 2009

(65) Prior Publication Data

US 2010/0088722 A1 Apr. 8, 2010

Related U.S. Application Data

(63) Continuation of application No. PCT/CN2008/072097, filed on Aug. 21, 2008.

(30) Foreign Application Priority Data

Aug. 22, 2007 (CN) .......................... 2007 1 0142059

(51) Int. Cl.
*G06F 3/00* (2006.01)
*G06F 13/00* (2006.01)
*H04N 5/445* (2006.01)

(52) U.S. Cl. .................. 725/46; 725/34; 725/35; 725/39

(58) Field of Classification Search .................... 725/34, 725/35, 39, 46
See application file for complete search history.

(56) References Cited

U.S. PATENT DOCUMENTS

| 7,028,331 | B2 * | 4/2006 | Schwalb ........................ 725/140 |
| 2004/0158858 | A1 | 8/2004 | Paxton et al. | |
| 2007/0002879 | A1 | 1/2007 | Lin | |
| 2007/0101377 | A1 * | 5/2007 | Six et al. .......................... 725/86 |
| 2007/0220575 | A1 * | 9/2007 | Cooper et al. ................ 725/118 |

FOREIGN PATENT DOCUMENTS

| CN | 1610330 A | 4/2005 |
| CN | 1848944 A | 10/2006 |
| CN | 1889540 A | 1/2007 |

(Continued)

OTHER PUBLICATIONS

First Office Action in Chinese Application No. 200710142059.4, mailed Apr. 17, 2009.

(Continued)

*Primary Examiner* — Christopher Kelley
*Assistant Examiner* — Charles N Hicks
(74) *Attorney, Agent, or Firm* — Leydig, Voit & Mayer, Ltd.

(57) ABSTRACT

A realization system, method and device for multimedia service are provided. In the realization system for multimedia service, a service middleware receives multimedia service location information updated by users, multimedia service scheduling policy and device maintenance information of a service control proxy and loads them onto a service location register; the service middleware starts up or stops corresponding service control proxy according to device maintenance information of the service control proxy; the service location register authenticates a user multimedia service control request according to multimedia service location information and determines a service control proxy for the user through authentication according to multimedia service scheduling policy; the user multimedia service control request is forwarded to a determined service control proxy; the determined service control proxy provides multimedia service interactive control with an interactive electronic program guide and multimedia service control with a service server. The control flow of multiple multimedia services is unified.

16 Claims, 10 Drawing Sheets

FOREIGN PATENT DOCUMENTS

| | | | |
|---|---|---|---|
| CN | 1917620 A | 2/2007 |
| CN | 1949866 A | 4/2007 |
| CN | 1968134 A | 5/2007 |
| CN | 101132300 A | 2/2008 |
| CN | 100591020 C | 2/2010 |
| WO | WO 01/60070 A1 | 8/2001 |
| WO | 2005/045552 A3 | 5/2005 |
| WO | WO 2006029247 A | 3/2006 |
| WO | 2006/044052 A2 | 4/2006 |
| WO | WO 2006/044052 A2 | 4/2006 |
| WO | WO 2007092122 A | 8/2007 |

OTHER PUBLICATIONS

Wei, Yang, et al., "IPTV—IMS-based IPTV," *ZTE Communications*, vol. 13, No. 1, Feb. 2007.

European Search Report in corresponding European Patent Application No. 08784088.0 (Apr. 28, 2010).

Written Opinion from the International Searching Authority in corresponding PCT Application No. PCT/CN2008/072097 (Dec. 4, 2008).

\* cited by examiner

SYSTEM, METHOD AND DEVICE FOR REALIZING MULTIMEDIA SERVICE

CROSS-REFERENCE TO RELATED APPLICATIONS

This application is a continuation of International Application No. PCT/CN2008/072097, filed on Aug. 21, 2008, which claims priority to Chinese Patent Application No. 200710142059.4, filed on Aug. 22, 2007, both of which are hereby incorporated by reference in their entireties.

FIELD OF THE INVENTION

The present invention relates to the field of communications, and more particularly to a realization system, a method and a device for multimedia services.

BACKGROUND OF THE INVENTION

Multimedia services for audiovisual entertainment are competitively provided by digital television (DTV) in the broadcast and television field, by internet protocol television (IPTV) in the conventional telecommunications field, and by music television (MTV) in the mobile communications field. As people increasingly demand enhanced audiovisual entertainment, the multimedia services provided by these competitors are incessantly enriched. Under such intensified competition, service operators at various fields are not satisfied with providing video-on-demand (VOD) value-added multimedia services in the traditional sense, but are instead proactively striving to search for differentiation and diversification of multimedia services, and are trying at the same time to lower the operation risk of multimedia services, lower the restriction to the application environments of multimedia services, improve the operation capability of differentiating multimedia services, shorten the period in introducing new multimedia services, optimize the interactive experiences, enhance the safety and reliability of operation of multimedia services, and thereby strengthen the competitiveness of multimedia services. In such backgrounds, service operators construct certain multimedia service systems by themselves to provide multimedia services, and cooperate with multimedia service providers/content providers to realize operation of multimedia services. In such cooperative operations of multimedia services, the service operators provide network and subscriber resources and provide support for the operation of multimedia services, and the multimedia service providers/content providers construct service servers to provide new multimedia services. Gain of the multimedia services is settled and divided between network companies and multimedia service providers/content provides according to the traffic of multimedia services, to thereby realize sharing of the gain of the multimedia services.

Networking is different due to different network environments in the prior art, and the networking is mainly the bidirectional network and the unidirectional network. The bidirectional network means in this context the presence of both the uplink channel and the downlink channel, while the unidirectional network means in this context the mere presence of the downstream channel. These two modes are respectively described below.

Networking of bidirectional network in the prior art is as shown in FIG. 1, in which a subscriber management system (SMS) or a service and business support system (BSS) is responsible for the operation management of the multimedia services, a service middleware is responsible for multimedia service management and the multimedia services adaptation, an interactive electronic program guide (EPG) server is responsible for presentation of the multimedia services as well as for access of the multimedia service control request sent by a subscriber via a set-top box, a service server is responsible for providing the multimedia services, and the set-top box and the television set are playing devices of the multimedia services.

Currently available multimedia services supported by networking of the bidirectional network are mainly divided into the following two parts. The first part includes VOD multimedia services, TV video on demand multimedia services based on live channels, time-shift multimedia services based on live channels, and network personal video recorder multimedia services based on live channels. This part of the multimedia services makes use of the set-top box to access in the multimedia service control request, and carries out control of the multimedia services through interaction between the set-top box terminal and the video server and interaction between the set-top box terminal and the service middleware. The second part includes online shopping multimedia services, advertisement multimedia services, and online gaming multimedia services, etc., and usually also makes use of the set-top box to access in the multimedia service control request, and carries out the operation through direct interaction between the set-top box and the corresponding service server.

As the inventors have found, the multimedia service control flow in the existing bidirectional network is greatly affected by the application environments of the multimedia services (such as the type of the network and the configuration of the set-top box, etc.) and the inherent characteristics of the multimedia services (such as the types and forms of expression of the multimedia services), and it is hence costly to realize the cooperative operation of plural types of multimedia services, resulting in the detriment to the development of multimedia services and the subsequent expansion of new multimedia services. With respect to the second part of existing multimedia services in the bidirectional network, since the multimedia service control is carried out through direct interaction between the set-top box and the service server without the necessary operation control and resources control on the multimedia services, it is disadvantageous to protect the interests of the subscribers and the service operators in the case of cooperative operation of multimedia services between service operators and multimedia service providers/content providers, and it is also difficult to control the risk of operation of multimedia services. The multimedia service control flows differ greatly with regard to different multimedia services, and the level of reuse of the multimedia service control flows is relatively low, thereby delaying the introduction of new multimedia services to certain degrees. With regard to different multimedia services, the operation procedures and result notification information of the multimedia services obviously differ, and this affects the experience of interaction of the multimedia services to certain degrees.

SUMMARY OF THE INVENTION

Embodiments of the present invention provide a system, a method, a service middleware, a service location register, a service control proxy and an interactive EPG server for realizing multimedia services, so as to unify control flows of a multiplicity of multimedia services.

A system for realizing a multimedia service includes a service control request access subsystem, a service location register, a service middleware, a service control proxy, an interactive EPG and a service server. The service middleware is configured to receive multimedia service location information updated by a subscriber, multimedia service scheduling policy of the service control proxy and device maintenance information of the service control proxy, load them respectively to the service location register, and start up or stops the corresponding service control proxy according to the device maintenance information of the service control proxy. The service control request access subsystem is configured to receive a subscriber multimedia service control request and forward the request to the service location register. The service location register is configured to authenticate the subscriber multimedia service control request according to the multimedia service location information, to determine, according to the multimedia service scheduling policy, the service control proxy for a subscriber having passed the authentication, and to forward the subscriber multimedia service control request to the determined service control proxy. The service control proxy is configured to perform multimedia service interaction control with the interactive EPG and to perform multimedia service control with the service server according to the subscriber multimedia service control request.

A service middleware includes: a subscriber service location management module, configured to receive a request from a subscriber for updating multimedia service location information, and to load the subscriber location information updated by the subscriber to a service location register; a service scheduling policy management module, configured to receive multimedia service scheduling policy of a service control proxy input by a system manager, and to load the multimedia service scheduling policy to the service location register; and a service control proxy management module configured to receive device maintenance information of the service control proxy input by a system manager, to start up or stop the corresponding service control proxy according to the device maintenance information, and to load the device maintenance information multimedia service of the service control proxy to the service location register.

A service location register includes a service location register communicating unit that is configured to realize communication with a service middleware, a service control request access subsystem, and a service control proxy, respectively; a service location information storing unit that is configured to store subscriber multimedia service location received by the service location register communicating unit from the service middleware; a service control request authenticating unit that is configured to authenticate the subscriber multimedia service control request forwarded by the service control request access subsystem according to the subscriber multimedia service location information stored in the service location information storing unit; a service scheduling policy storing unit that is configured to store multimedia service scheduling policy received by the service location register communicating unit from the service middleware; and a service control proxy selecting unit that is configured to determine a service control proxy for a subscriber having passed the authentication, according to the multimedia service scheduling policy stored in the service scheduling policy storing unit, and to forward the subscriber multimedia service control request to the determined service control proxy via the service location register communicating unit.

A service control proxy includes a service control proxy communicating unit that is configured to realize communication respectively with a service location register, an interactive EPG, and a service server; an operation controlling unit that is configured to start up or stop the service control proxy according to a control command received by the service control proxy communicating unit from a service middleware; and a service controlling unit that is configured to perform multimedia service interaction control with the interactive EPG and to perform multimedia service control with the service server via the service control proxy communicating unit according to a subscriber multimedia service control request received by the service control proxy communicating unit from the service location register.

An interactive EPG server includes a WEB service module that is configured to receive a subscriber multimedia service control request from a subscriber set-top box and to forward the request to a service location register; and a service interactive control module that is configured to perform multimedia service interaction control with a service control proxy.

A method of controlling a multimedia service includes: receiving, by a service location register, a subscriber multimedia service control request forwarded by a service control request access subsystem; authenticating, by the service location register, the multimedia service control request according to subscriber multimedia service location information loaded by a service middleware; determining, by the service location register, a service control proxy for a subscriber having passed the authentication according to multimedia service scheduling policy of the service control proxy loaded by the service middleware, and forwarding the multimedia service control request to the service control proxy; and performing, by the service control proxy, multimedia service interaction control with an interactive EPG and performing multimedia service control with a service server according to the multimedia service control request.

By providing the service location register and the service control proxy, embodiments of the present invention achieve unification of control flows of a multiplicity of multimedia services, satisfy the requirements of cooperative operation of the multiplicity of multimedia services, enhance the level of reuse of the control flows of the multimedia services, quicken the speed of response to the requirements of novel multimedia services, and such unification improves the interactive experience of the multimedia services to certain degrees.

DETAILED DESCRIPTION OF THE EMBODIMENTS

In currently available audiovisual entertainment interactive multimedia services, no matter whether the service operator constructs the multimedia service system by itself or cooperates with the multimedia service provider/content provider, the service operator is required to have sufficient strength in multimedia service operation control and multimedia service resource control on multimedia services from the perspectives of protecting the interests of each party concerned and of lowering operation risks. This requires that both multimedia service operation control and multimedia service resource control on a multiplicity of multimedia services be brought into multimedia service control flows. Moreover, it is required to unify the multimedia service control flows both for realizing cooperative operation of a multiplicity of multimedia services and for enhancing the differentiated operation capabilities of the multimedia services. Reduction of the introduction period of a novel multimedia service calls for enhancement of the level of reuse of the newly added multimedia service with regard to the existing multimedia service control flows, and lowering of the influence on the quality and stability of the existing multimedia service control flows. One important issue of the optimized interactive experience is to unify the multimedia service interaction control processes and to unify the operation result notification information under various scenarios for experience.

Figure 1:
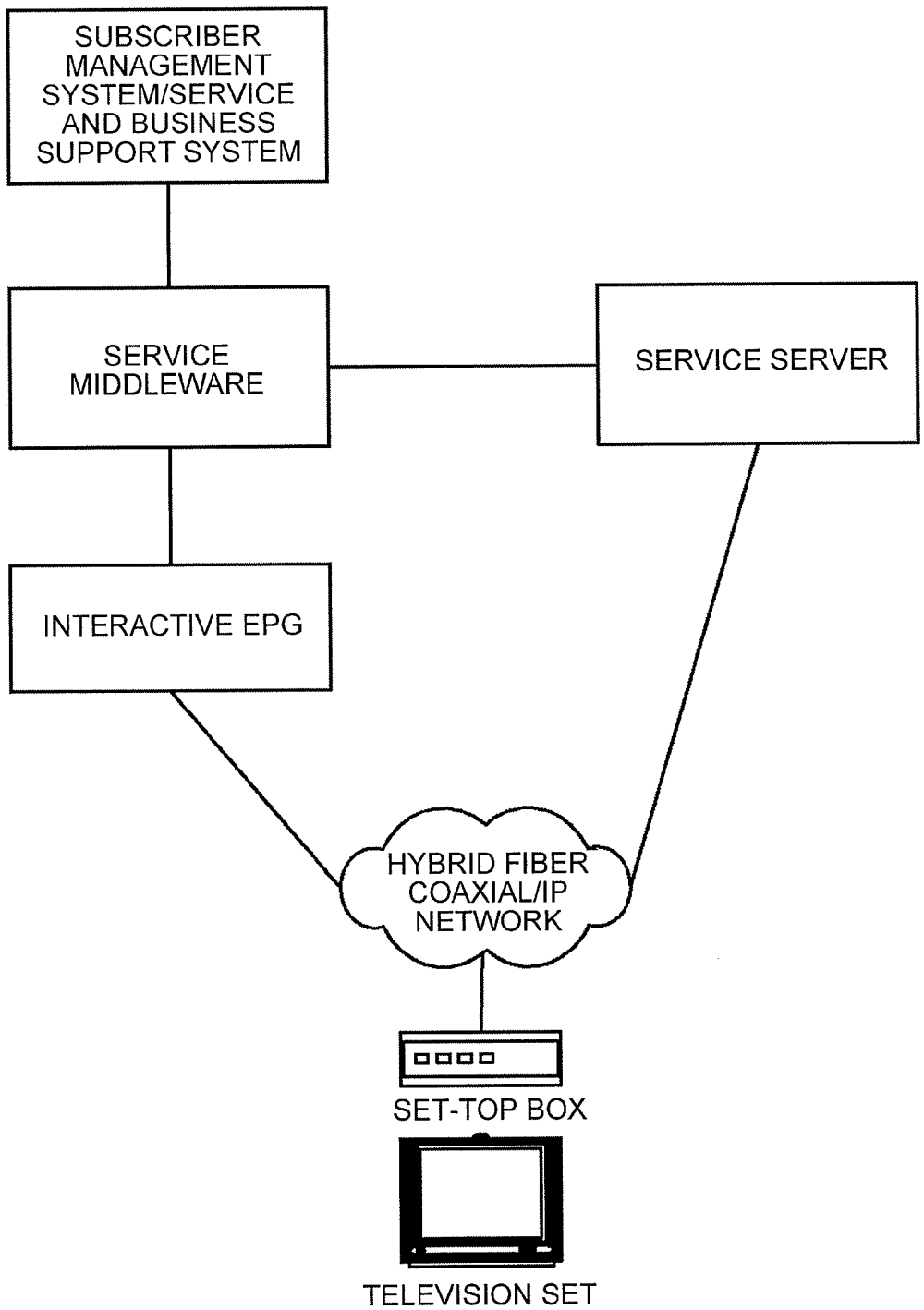
FIG. 1 is a schematic structural view exemplarily illustrating networking of the existing bidirectional network.
Figure 2A:
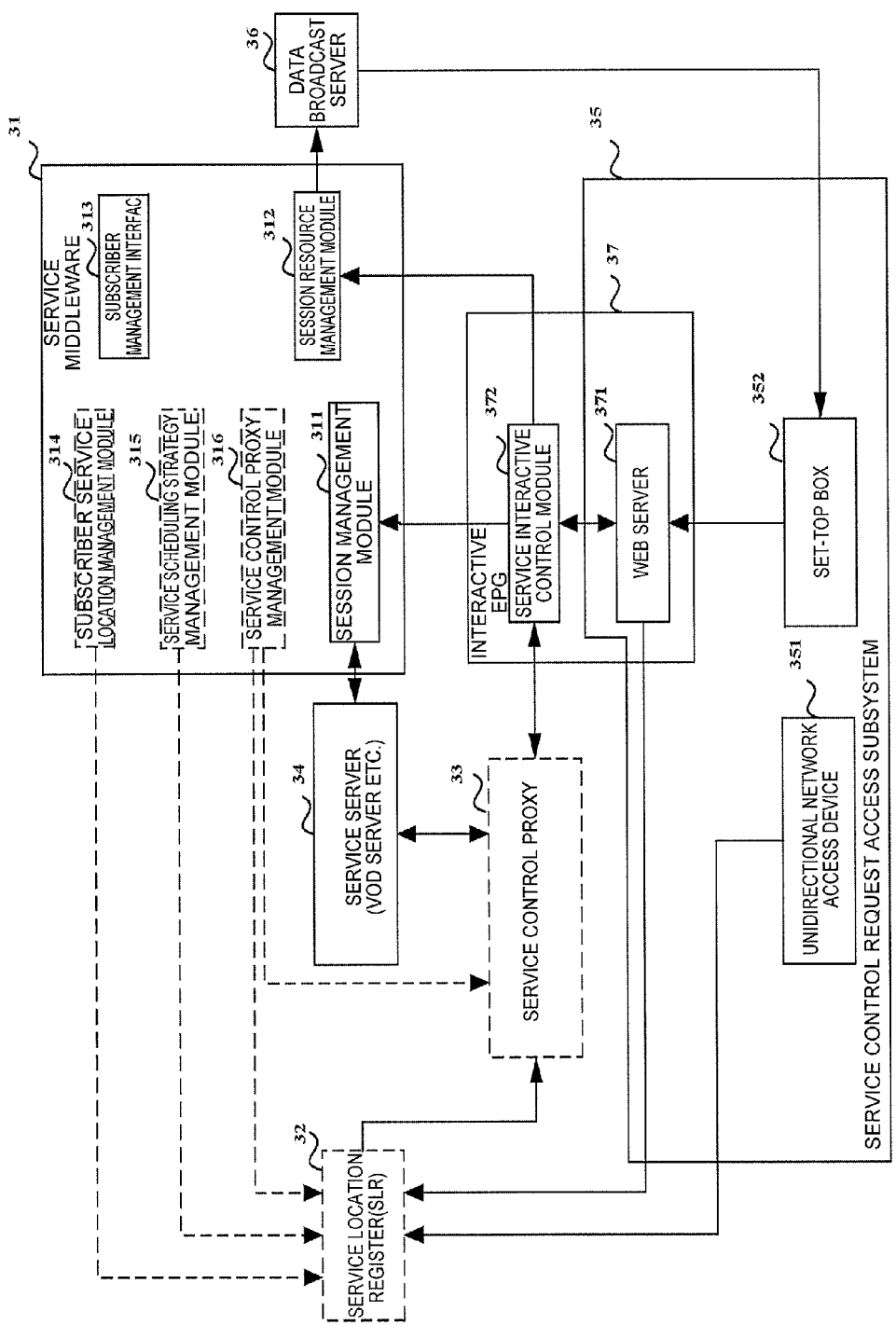
FIG. 2a is a schematic main structural view exemplarily illustrating the Realization system for multimedia service and the service middleware according to an embodiment of the present invention.

As shown in FIG. 2a, to unify the control flows of a multiplicity of multimedia services, an embodiment of the present invention mainly provides three devices of a service location register (SLR), a service control proxy and an interactive EPG, and the service location register, the service control proxy, a service middleware, the interactive EPG, a service control request access subsystem and a service server together constitute the Realization system for the multimedia service according to this embodiment of the present invention, wherein the service middleware includes the following functions:

1. subscriber multimedia service location management function, including opening, closing, information modifying and querying of the multimedia service requested by a subscriber, and driving subscriber multimedia service location information to be loaded on the service location register;

2. multimedia service scheduling policy configuration and management function, including adding, deleting, modifying and querying of the multimedia service scheduling policy, and driving the multimedia service scheduling policy to be loaded online to the service location register; and 3. service control proxy management function, including adding, deleting, modifying, load querying of the service control proxy, controlling the service of the corresponding service control proxy to start up and to stop according to the management operation, and instructing the service location register to load information of the service control proxy.

The service control request access subsystem includes the function of forwarding all the multimedia service control requests of the subscriber to the service location register.

In the realization system for the multimedia service according to this embodiment of the present invention, the service location register authenticates the multimedia service control request of the subscriber according to the subscriber multimedia service location information as configured by the service middleware, schedules, after successful authentication, the multimedia service control request of the subscriber to the suitable service control proxy according to the multimedia service scheduling policy as configured by the service middleware, and the control of the multimedia service is carried out through interaction between the service control proxy and the service middleware and interaction between the service control proxy and the service server, wherein the control of the multimedia service includes multimedia service resource control, multimedia service process control and multimedia service operation control, etc., so as to unify the control flows of a multiplicity of multimedia services.

The interactive EPG 37 according to this embodiment of the present invention forwards all the multimedia service control request of the subscriber to the service location register and opens the multimedia service interaction control function, so as to make it possible for the service control proxy to realize multimedia service interaction control directly through the service interactive control module 372 in the interactive EPG 37.

For the bidirectional network, the service control request access subsystem includes a Web server 371 and a set-top box 352.

For the unidirectional network, the service control request access subsystem includes such access devices of the subscriber as the various mobile terminal (access via short message), fixed terminal (access via telephone set) and computer (access via Internet).

As shown in FIG. 2a, the realization system for multimedia service according to this embodiment of the present invention includes a service middleware 31, a service location register 32, a service control proxy 33, a service control request access subsystem 35 and an interactive EPG 37.

The service middleware 31 according to this embodiment of the present invention mainly includes: a session management module 311, a session resource management module 312, a subscriber management interface 313, a subscriber service location management module 314, a service scheduling policy management module 315 and a service control proxy management module 316. The subscriber service location management module 314, the service scheduling policy management module 315 and the service control proxy management module 316 are three functional modules added in the service middleware 31 in this embodiment of the present invention.

The subscriber service location management module 314 is configured to receive a request for updating the subscriber multimedia service location information via the subscriber management interface 313, and to load the updated subscriber multimedia service location information to the service location register 32.

The service scheduling policy management module 315 is configured to receive multimedia service scheduling policy of the service control proxy 33 input by a system manager, and to load the multimedia service scheduling policy to the service location register 32.

The service control proxy management module 316 is configured to receive device maintenance information of the service control proxy 33 input by a system manager, start up or stop the corresponding service control proxy according to the device maintenance information, and is configured to load the device maintenance information of the service control proxy 33 to the service location register 32.

By using the service location register and the service control proxy to form the realization system for multimedia service, this embodiment of the present invention achieves unification of control flows of a multiplicity of multimedia services, satisfies the requirements of cooperative operation of the multiplicity of multimedia services, enhances the level of reuse of the control flows of the multimedia services, quickens the speed of response to the requirements of novel multimedia services, and improves the interactive experience of the multimedia services to certain degrees due to the unification of the control flows as well as the unification of prompts of the subscriber during the process of interaction.

Moreover, according to the realization system for multimedia service according to this embodiment of the present invention, the second part of the multimedia service in the existing bidirectional network is also carried out via interaction between the service control proxy and the service server, and interaction between the service control proxy and the interactive EPG realizes the necessary operation control and resource control on the multimedia service, thus effectively protecting the interests of each party concerned with the multimedia service and lowering the operation risks of the multimedia service in the case the service operator cooperates with the multimedia service provider or content provider to carry out operation of the multimedia service.

Figure 2B:
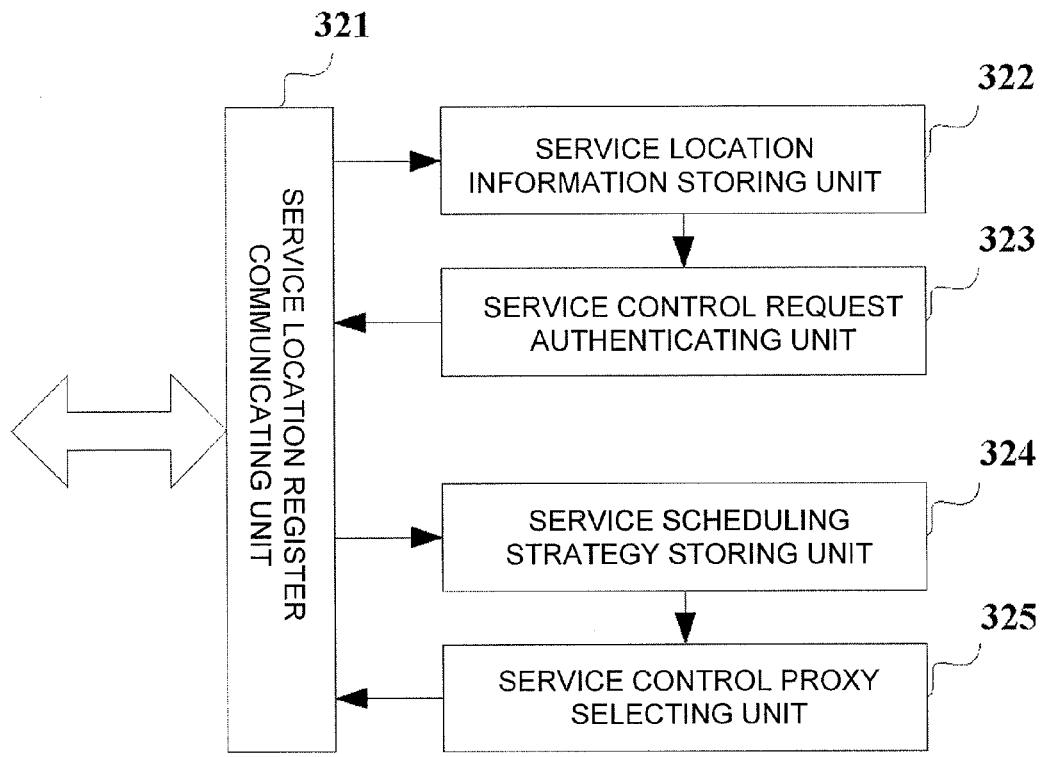
FIG. 2b is a schematic main structural view exemplarily illustrating the service location register according to an embodiment of the present invention.

As shown in FIG. 2b, the service location register 32 according to this embodiment of the present invention mainly includes: (1) a service location register communicating unit 321, configured to implement communication with the service control request access subsystem 35, the service middleware 31 and the service control proxy 33, respectively; (2) a service location information storing unit 322, configured to store the subscriber multimedia service location information received by the service location register communicating unit 321 from the service middleware 31; (3) a service control request authenticating unit 323, configured to authenticate the subscriber multimedia service control request forwarded by the service control request access subsystem 35, according to the subscriber multimedia service location information stored in the service location information storing unit 322; (4) a service scheduling policy storing unit 324, configured to store the multimedia service scheduling policy received by the service location register communicating unit 321 from the service middleware 31; and (5) a service control proxy selecting unit 325, configured to select the service control proxy 33 for the subscriber having passed the authentication, according to the multimedia service scheduling policy stored in the service scheduling policy storing unit 324, and to forward the subscriber multimedia service control request to the selected service control proxy 33 via the service location register communicating unit 321.

The service location register according to this embodiment of the present invention carries out dynamic scheduling of the multimedia service request, so as to facilitate differentiated operations of the multimedia service, effectively reduce the influence of single-point failure in the service server, satisfy the requirements of continuous online update and expansion of the multimedia service, and hence enhance the reliability of operation of the multimedia service to certain degrees. Moreover, completion of authentication of the subscriber multimedia service control request in the service location register effectively controls the influence of malicious attacks on the multimedia service, and hence enhances the safety of operation of the multimedia service to certain degrees.

Figure 2C:
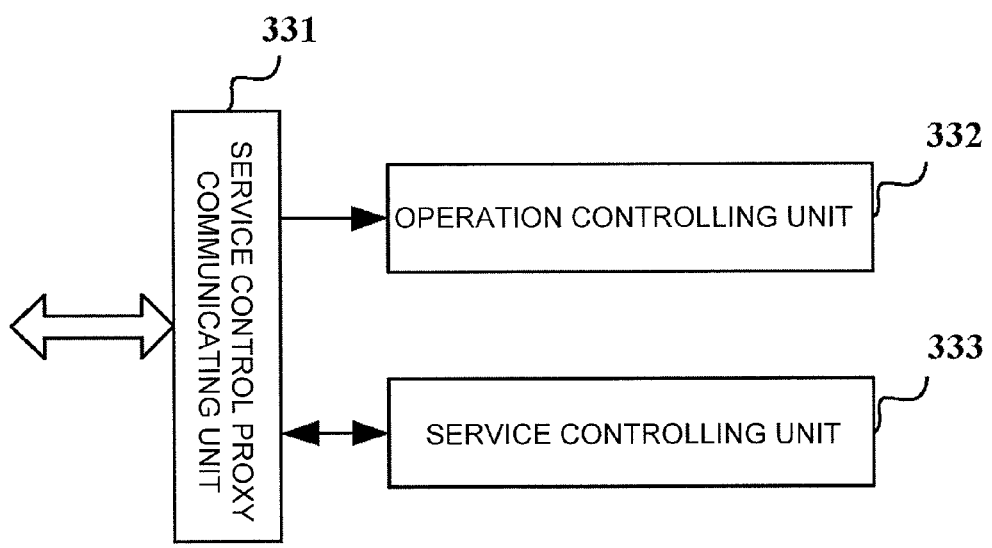
FIG. 2c is a schematic main structural view exemplarily illustrating the service control proxy according to an embodiment of the present invention.

As shown in FIG. 2c, the service control proxy 33 according to this embodiment of the present invention mainly includes: (1) a service control proxy communicating unit 331, configured to communicate respectively with the service location register 32, the service middleware 31, the service server 34, and the interactive EPG; (2) an operation controlling unit 332, configured to start up or stop the service control proxy 33 according to a control command received by the service control proxy communicating unit 331 from the service middleware 31; and (3) a service controlling unit 333, configured to perform multimedia service interaction control with the interactive EPG and perform multimedia service control with the service server via the service control proxy communicating unit 331, according to the subscriber multimedia service control request received by the service control proxy communicating unit 331 from the service location register 32.

More service control proxies 33 can be provided in stages in this embodiment of the present invention.

The service control proxy according to this embodiment of the present invention effectively reduces the influences of the application environments (such as the type of the network and the configuration of the set-top box, etc.) and the inherent characteristics of the multimedia services (such as the types and forms of expression of the multimedia services) on the operation of the multimedia service.

The interactive EPG server in this embodiment may include a WEB service module that is configured to receive a subscriber multimedia service control request from a subscriber set-top box and forward the request to a service location register; and a service interactive control module that is configured to perform multimedia service interaction control with the service control proxy.

The service control request access subsystem 35 in this embodiment of the present invention may include a unidirectional network access device 351, which may be such access device as various mobile terminal (access via short message), fixed terminal (access via telephone set) and computer (access via Internet) of the subscriber, and which is connected to the service location register 32 via a corresponding network; and may also include a Web server 371 and a set-top box 352 of a bidirectional network.

In the embodiment of the present invention, broadcasting of the multimedia service playing parameter is executed by a data broadcast server 36, whose function is achieved by the interactive EPG37 in the case the bidirectional network makes use of the set-top box to request the multimedia service control, that is to say, the data broadcast server and the interactive EPG37 are arranged in unison. However, for the unidirectional network, the function of the data broadcast server is usually assumed by a unicast server or a multicast server.

The service control request access subsystem 35 forwards the multimedia service control request of the subscriber to the service location register 32 in an unified manner, and the service location register 32 mainly performs authentication of the subscriber multimedia service control request and applies configured scheduling policy to schedule the control request of the subscriber to the suitable service control proxy 33. The service control proxy 33 mainly performs multimedia service interaction control with the interactive EPG, including interaction process control, multimedia service resource control and multimedia service operation control, as well as multimedia service control with the service server 34 including control logic and multimedia service control protocol stack.

Referring to FIG. 2a, the arrow in dotted line indicates management instructions, and the arrow in solid line indicates multimedia service interaction instructions.

In the embodiment of the present invention, the service middleware 31 possesses the subscriber multimedia service location management function, which is executed by the subscriber service management module 314. The subscriber multimedia service location management includes opening, closing, information modifying and querying of the multimedia service requested by the subscriber, and driving the subscriber multimedia service location information to be loaded on the service location register. To perform subscriber multimedia service location information management, the following Table 1 shows examples of fields and formats defined by the relevant management signaling:

TABLE 1

| Fields | Types and Lengths | Explanations |
|---|---|---|
| Multimedia service key | CHAR[10] | Multimedia service identification, valuations:<br>000001-VOD multimedia service<br>000002-time-shift multimedia service<br>000003-recording and playing multimedia service<br>000004-network personal camcorder multimedia service<br>000005-online television shopping multimedia service<br>000006-interactive television advertisement multimedia service<br>000007-online lottery betting multimedia service<br>000008-online television reading multimedia service<br>000009-online television gaming multimedia service<br>000010~retained for assignment |
| Multimedia service authentication number | CHAR[64] | The number used in requesting the multimedia service control, for instance, the mobile telephone number can be used in multimedia service on demand of a short message as the authentication number of the multimedia service |
| Authentication code | CHAR[8] | Code or authentication code in requesting authentication; whether this field is needed in practical application depends upon practical circumstances |
| Subscriber number | CHAR[32] | The subscriber number with which the multimedia service is opened |
| Region identification | CHAR[60] | Identification of the region in which the subscriber is located |

In the embodiment of the present invention, the service middleware 31 possesses the multimedia service scheduling policy configuration and management function, which is executed by the service scheduling policy management module 315, and which includes adding, deleting, modifying and querying of the multimedia service scheduling policy, and driving the multimedia service scheduling policy to be loaded online on the service location register. To perform multimedia service scheduling policy management, the following Table 2 shows examples of fields and formats defined by the relevant management signaling:

TABLE 2

| Fields | Types and Lengths | Explanations |
|---|---|---|
| Policy number | CHAR[12] | Identification of policy |
| Policy name | CHAR[20] | Name of policy |
| Multimedia service key | CHAR[10] | Identification of multimedia service |
| Scheduling type | CHAR[1] | Multimedia service scheduling types, valuations:<br>1-scheduling according to multimedia service and region;<br>2-scheduling according to multimedia service and load;<br>3-scheduling according to multimedia service, region and load;<br>4-synthesized scheduling according to configuration conditions;<br>5~retained for assignment |
| Scheduling condition | CHAR[1000] | Meaningful when the scheduling type is "4- synthesized scheduling according to configuration conditions"; a combination of one or more conditions, for instance, if a gaming multimedia service is to be scheduled according to such characteristics as the device model type, the network type and the home address of the subscriber, and suppose only a subscriber whose set-top box is model-typed as STB_GAME, who is using an IP network and whose home address is Wangfu International Garden can be scheduled to the Legend Game multimedia service, the configuration can be set as "[set-top box model type of subscriber]=STB_GAME AND [network type of subscriber]=AND[address of subscriber]=Wangfu International Garden" |
| Priority | INTEGER | Policy priority: the higher the valuation the higher the priority |
| Validation period | CHAR[1] | 0-always valid; 1- day; 2-week; 3- year; 4-certain day of certain year |
| Start time | CHAR[14] | This value is meaningless in the case the validation period of the policy is "always valid";<br>This value is the control start time in each day in the case the validation period of the policy is "day";<br>This value is the control start day in each week in the case |

TABLE 2-continued

| Fields | Types and Lengths | Explanations |
|---|---|---|
| | | the validation period of the policy is "week"; This value is the control start day in each year in the case the validation period of the policy is "year"; This value is the control start date in the case the validation period of the policy is "certain day of certain year"; |
| End time | CHAR[14] | This value is meaningless in the case the validation period of the policy is "always valid"; This value is the control end time in each day in the case the validation period of the policy is "day"; This value is the control end date in each week in the case the validation period of the policy is "week"; This value is the control end date in each year in the case the validation period of the policy is "year"; This value is the control end date in the case the validation period of the policy is "certain day of certain year"; |

In the embodiment of the present invention, the service middleware 31 possesses service control proxy management function, which is executed by the multimedia service control proxy module 316, and which includes adding, deleting, modifying, load querying of the service control proxy, controlling to start up and to stop the service of the corresponding service control proxy according to the management operation, and instructing the service location register to load the service control proxy information. To perform service control proxy management, the following Table 3 shows examples of fields and formats defined by the relevant management signaling:

TABLE 3

| Fields | Types and Lengths | Explanations |
|---|---|---|
| Number | CHAR[12] | Identification of service control proxy |
| Name | CHAR[20] | Name of service control proxy |
| IP address | CHAR[15] | Communication IP address of service control proxy |
| Port | INT | Communication port of service control proxy |
| Maximum load | INT | Maximum loading number supportable by service control proxy |
| Valid status | CHAR[1] | Valid status of service control proxy, including: 1-enable; 0-disable |
| Health status | CHAR[1] | Health status of service control proxy, including: 1- normal service; 2- overload; 3- abnormal connection; used for query only, with the default as "1-normal service" in initialization |
| Region list | CHAR[60][ ] | List of regions where services can be provided by service control proxy, variable length arrays, where each element is a region identification |
| Multimedia service list of proxy | CHAR[10][ ] | List of multimedia service keys representable by service control proxy, variable length arrays, where each element is a multimedia service identification. There can be only one identical multimedia service in this list. |
| Description | CHAR[256] | Descriptive information of service control proxy |

As should be noted, Table 1, Table 2 and Table 3 are merely examples of fields and formats defined by relevant management signaling, and these fields and formats can be adjusted on demand of setup of the multimedia services, and do not restrict implementation of the technical solutions of the present invention.

Specific flows for realizing subscriber multimedia service location management, multimedia service scheduling policy management, service control proxy management and multimedia service control are described respectively and in detail below with reference to the accompanying drawings.

1. Subscriber Multimedia Service Location Management

Figure 3:
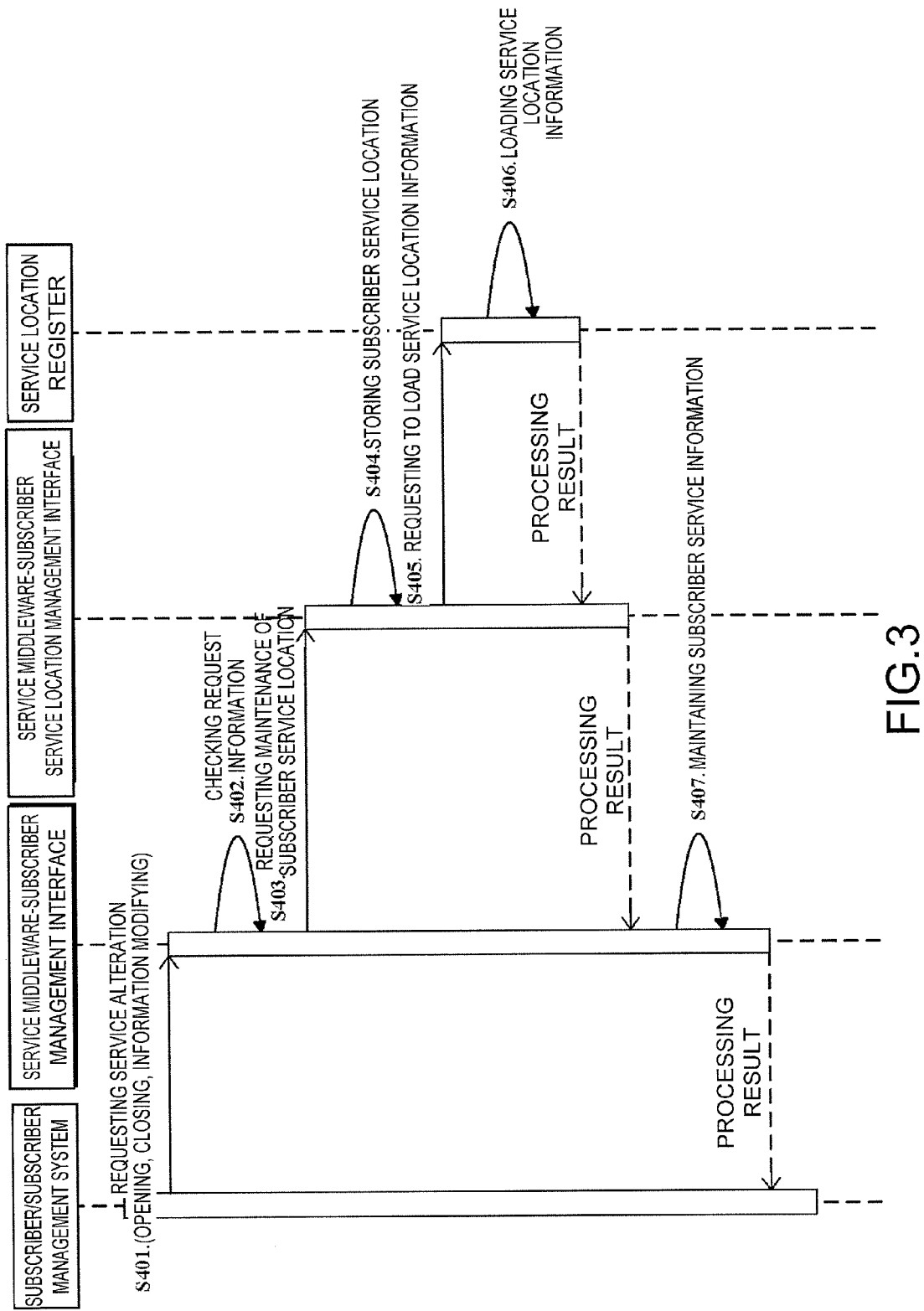
FIG. 3 is a schematic flowchart exemplarily illustrating subscriber multimedia service location management according to an embodiment of the present invention.

Flow of subscriber multimedia service location management is as shown in FIG. 3, and mainly includes the steps as follows.

S401: The subscriber submits a multimedia service alteration request to the subscriber management interface of the service middleware either directly or via a subscriber management system (SMS or BSS). The multimedia service alteration request includes opening and closing of the multimedia service, and modifying information of the multimedia service, etc.

S402: The subscriber management interface of the service middleware parses the information of the requested operation from the multimedia service alteration request message, and checks validity, including check of the operation and check of the operation content information. Check of the operation includes operator identity authentication, request operation type authentication (opening, closing, and modifying), and check standard of the operation content information generally includes types, lengths and formats of content attributes (this can be done according to practical agreement of interface protocol) as well as restriction between content and content (exclusiveness guarantee, etc.);

S403: The subscriber management interface of the service middleware requests the subscriber service location management module to maintain the multimedia service location information of the subscriber;

S404: The subscriber service location management module of the service middleware stores the subscriber multimedia service location information checked as valid;

S405: The subscriber service location management module of the service middleware submits a request to the service location register to load the multimedia service location information, wherein the request includes the multimedia service location information currently updated by the subscriber (opening, closing and modifying information of the multimedia service);

S406: The service location register loads the multimedia service location information currently updated, and returns the processing result; and S407: The subscriber management interface of the service middleware maintains the multimedia service information of the subscriber, and returns the result to the subscriber or the subscriber management system.

2. Multimedia Service Scheduling Policy Management

Figure 4:
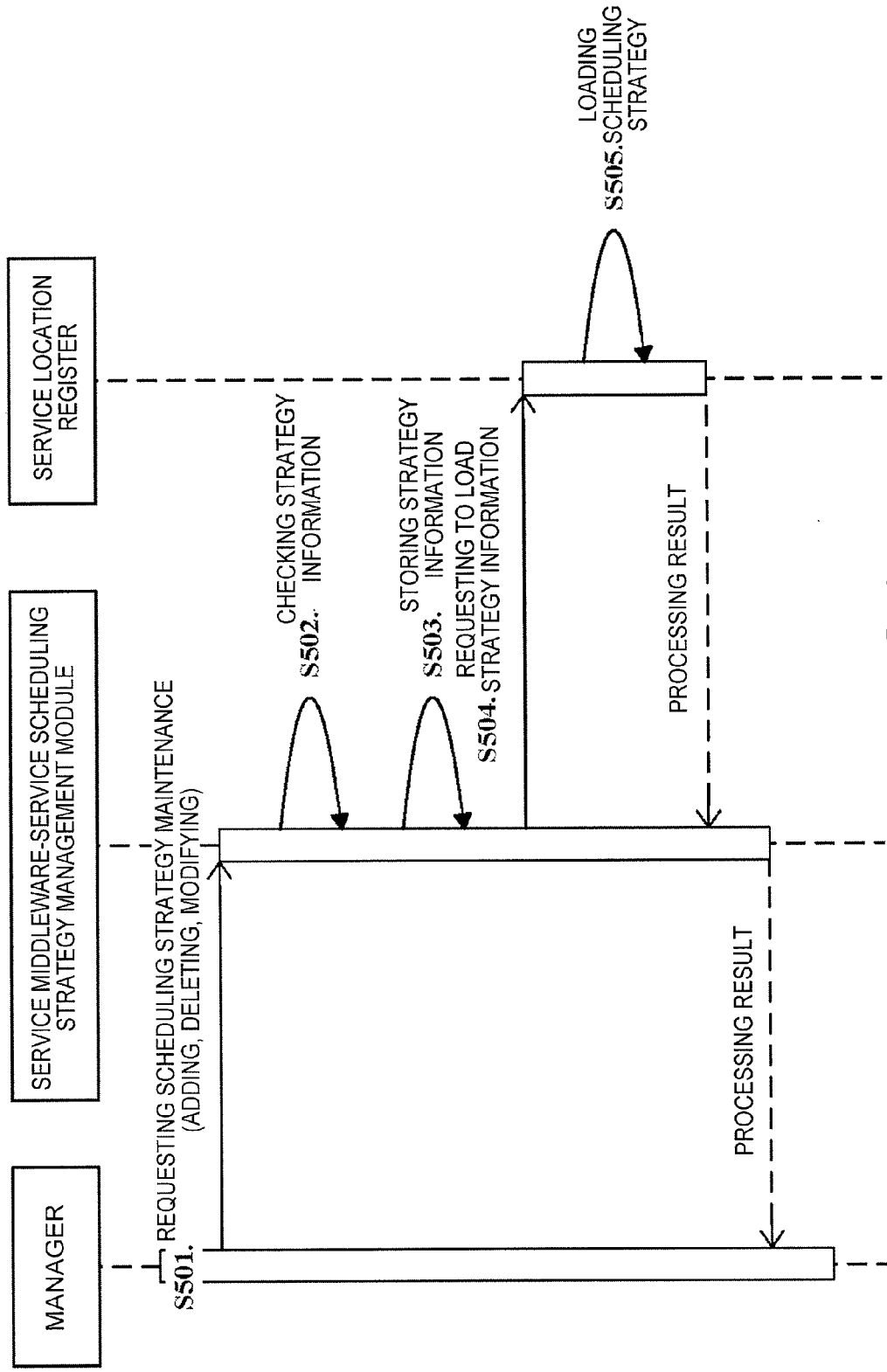
FIG. 4 is a schematic flowchart exemplarily illustrating subscriber multimedia service scheduling policy management according to an embodiment of the present invention.

Flow of subscriber multimedia service scheduling policy management is as shown in FIG. 4, and mainly includes steps as follows.

S501: The manager submits a multimedia service scheduling policy maintenance request (including requests for adding, deleting or modifying) to the service scheduling policy management module of the service middleware;

S502: The service scheduling policy management module of the service middleware parses the information of the requested operation and the policy information from the multimedia service scheduling policy request message, and checks validity of the information, including check of the operation and check of the operation content information. Check of the operation includes operator identity authentication, request operation type authentication (within the range of adding, deleting and modifying), and check standard of the operation content information generally includes types, lengths and formats (already defined in the policy tables) of content attributes as well as restriction between content and content (exclusiveness guarantee, etc.);

S503: The service scheduling policy management module of the service middleware permanently stores the multimedia service policy information checked as valid, namely storing in such media as a hard disk or a magnetic tape, so that information will not lost in the case of system rebooting or abnormal system failure;

S504: The multimedia service policy management module of the service middleware submits a request to the service location register to load the multimedia service scheduling policy; and S505: The service location register loads the corresponding multimedia service scheduling policy, and returns the processing result.

3. Service Control Proxy Management

Figure 5:
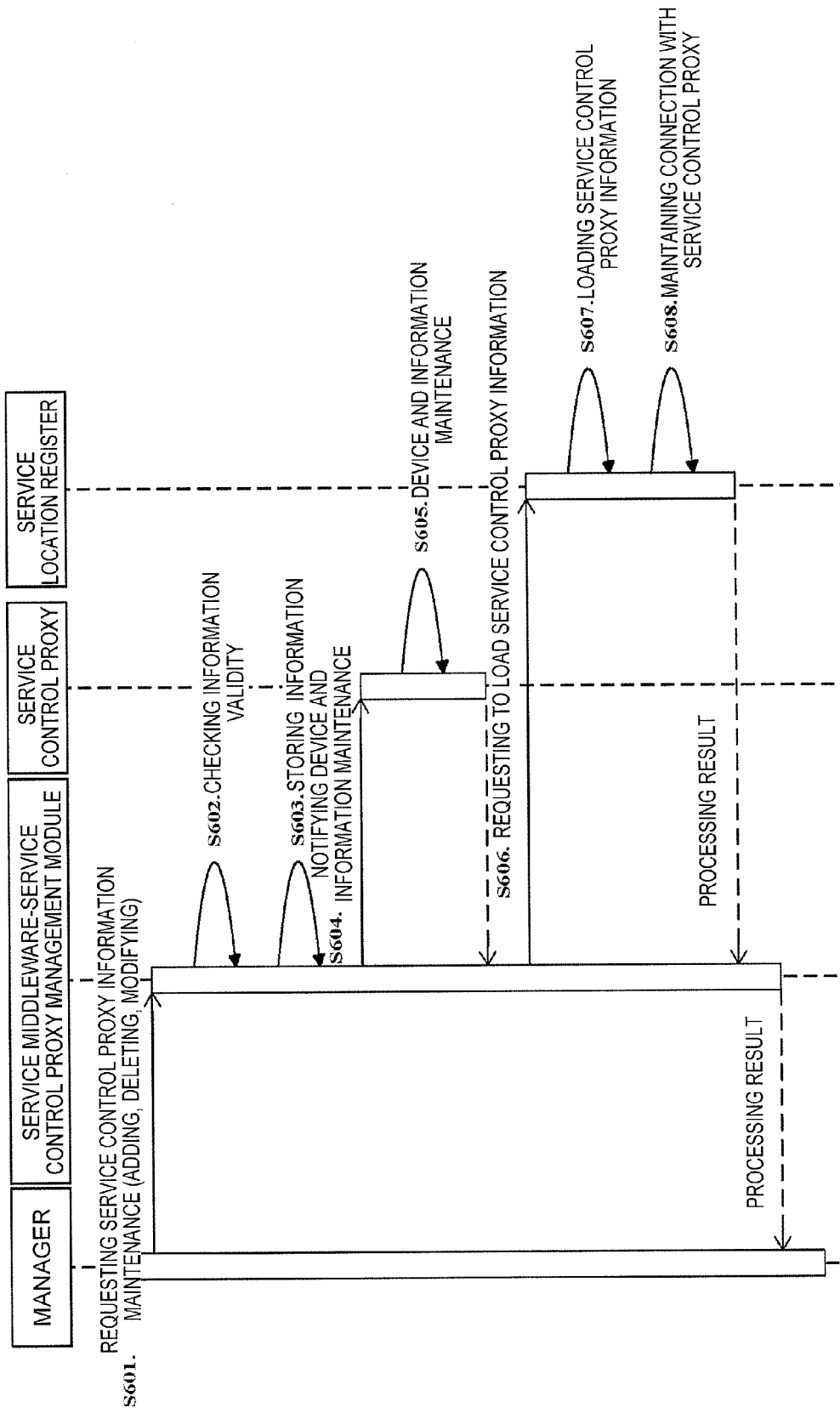
FIG. 5 is a schematic flowchart exemplarily illustrating service control proxy management according to an embodiment of the present invention.

Flow of service control proxy management is as shown in FIG. 5, and mainly includes steps as follows.

S601: The manager submits a device information maintenance request (including requests for adding, deleting and modifying information, starting up or stopping the service control proxy, etc.) of the service control proxy to the service control proxy management module of the service middleware;

S602: The service control proxy management module of the service middleware parses the information of the requested operation from the device information maintenance request message, and checks validity of the information;

S603: The service control proxy management module of the service middleware stores the information checked as valid;

S604: The service control proxy management module of the service middleware notifies the service control proxy of the current operation and data;

S605: The service control proxy controls (starts up and stops) the proxy service and maintains information (including status information of the proxy service, subscriber service information already under proxy, and the current loading information, etc.) according to the operation requirement, and returns the processing result;

S606: The service control proxy management module of the service middleware submits a request to the service location register to load the service control proxy information (including service control proxy information already started up or already stopped, etc.);

S607: The service location register loads the corresponding service control proxy information, and returns the processing result to the service middleware; and S608: The service location register maintains communication connection with each service control proxy already started up, so as to perform control of the subscriber multimedia service.

4. Multimedia Service Control

When a subscriber uses a complete round of multimedia service, and the interactive operation includes four parts of multimedia service navigation, multimedia service request and multimedia service transmission, multimedia service process control, and multimedia service completion. The part of multimedia service navigation is mainly used to guide the subscriber to complete the interactive operation. Embodiments of the present invention do not involve modification of the part of multimedia service navigation, so that the part of multimedia service navigation is not discussed in this paper. The three parts of multimedia service request and multimedia service transmission, multimedia service process control, and multimedia service completion are to be emphatically discussed in the embodiments of the present invention.

Figure 6:
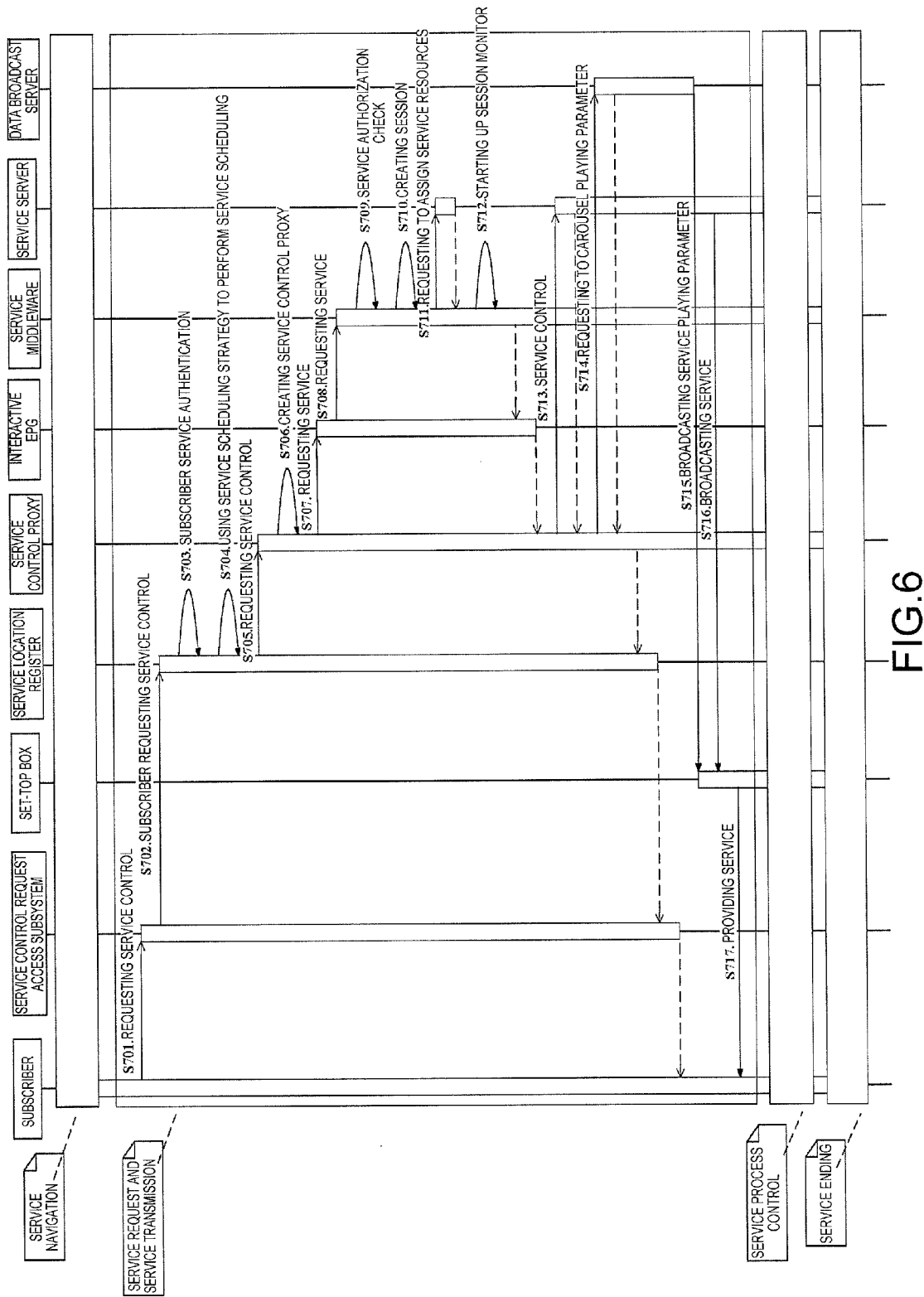
FIG. 6 is a schematic flowchart exemplarily illustrating sending of the multimedia service request and the multimedia service according to an embodiment of the present invention.

The flow of multimedia service request and multimedia service transmission in the interactive operation is firstly explained below, which flow includes, as shown in FIG. 6, mainly steps as follows.

Figure 7:
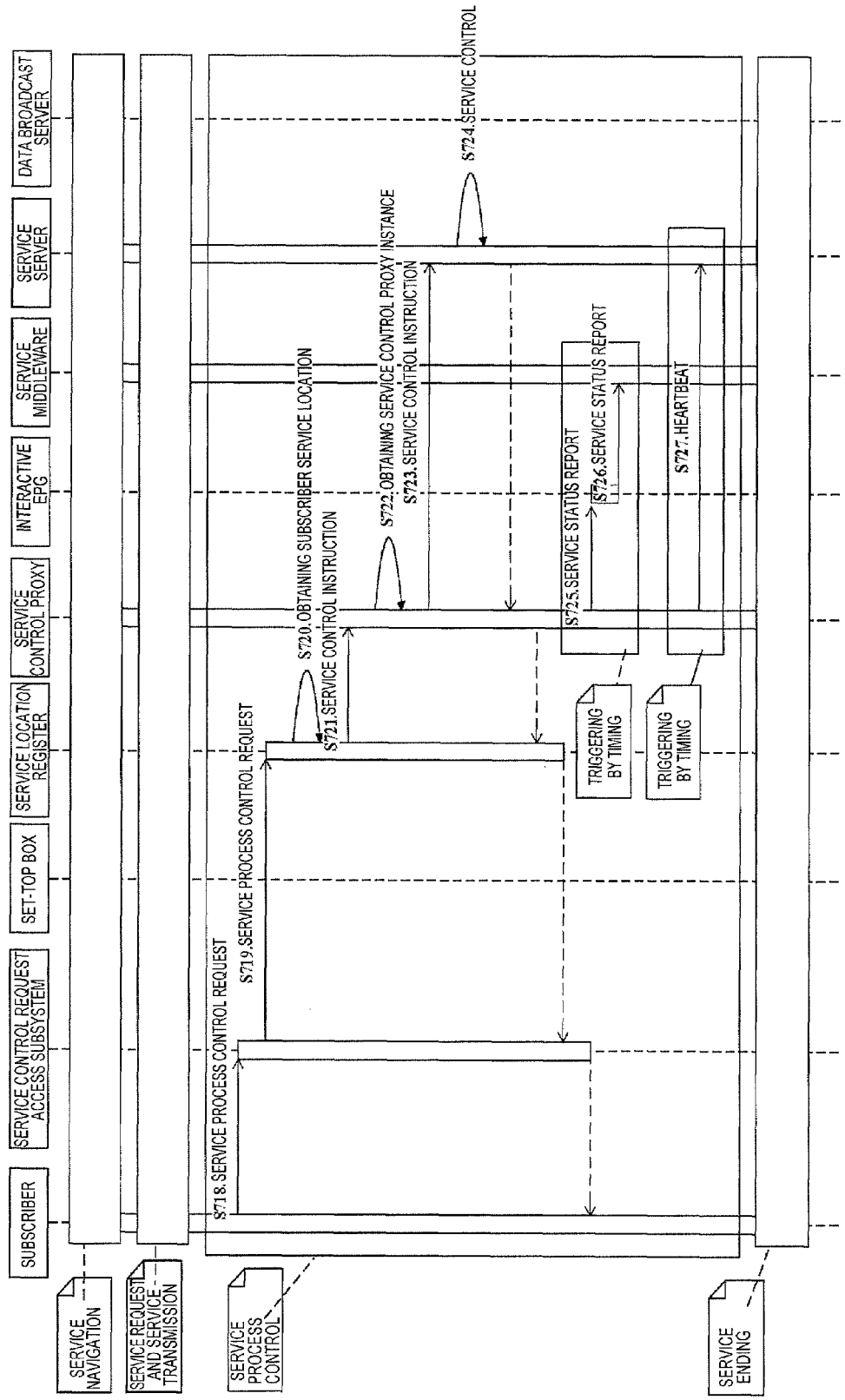
FIG. 7 is a schematic flowchart exemplarily illustrating multimedia service process control according to an embodiment of the present invention.

S701: The subscriber sends a multimedia service control request to the service control request access subsystem via a terminal (such as a mobile telephone, a fixed telephone set, a computer, or a set-top box, etc.);

S702: The service control request access subsystem sends the subscriber request to the service location register;

S703: The service location register obtains the multimedia service key, the multimedia service authentication number and the authentication code information from the request, authenticates the multimedia service requested by the subscriber, and obtains the subscriber identification and the location of the subscriber multimedia service if authentication is successful;

S704: The service location register matches the multimedia service scheduling policy according to the multimedia service requested by the subscriber and the requesting time: if a multiplicity of policies are matched, one policy with the highest priority or a random policy is selected therefrom, the multimedia service scheduling policy is then used in combination with the subscriber information and the service control proxy information to finally determine the suitable service control proxy;

S705: The service location register packages and sends the multimedia service control request information and the subscriber multimedia service information to the service control proxy determined by the multimedia service scheduling;

S706: The service control proxy creates a corresponding instance of service control proxy according to the multimedia service requested by the subscriber;

S707: The instance of service control proxy constructs a multimedia service control request and sent to the interactive EPG;

S708: The interactive EPG converts the request and locates the service middleware, and then sends the multimedia service control request to the service middleware;

S709: The service middleware completes multimedia service authorization check to determine whether the requesting subscriber has permission to the multimedia service: if yes, the process continues to S710; if not, a rejection response is returned;

S710: The service middleware creates a session and assigns system and network resources to the subscriber according to the multimedia service control request;

S711: The service middleware requests the service server to assign resources, and the service server performs resource scheduling according to the parameter data as requested and based on the loading statuses of the data broadcast server and the service server, prepares to broadcast the multimedia service and sends the prepared multimedia service playing parameter to the service middleware;

S712: The service middleware starts up a session overtime monitor to monitor status of the session, and sends the multimedia service playing parameter to the service control proxy via the interactive EPG;

S713: The instance of service control proxy sends the multimedia service control request to the service server;

S714: The instance of service control proxy sends the multimedia service playing parameter to the data broadcast server (such as an interactive EPG, a unicast server or a multicast server), returns the processing result of the current multimedia service control request after successful processing, and finally notifies the subscriber via the service control request access subsystem;

S715: The data broadcast server broadcasts the multimedia service playing parameter to the subscriber set-top box;

S716: The service server broadcasts the multimedia service requested by the subscriber to the subscriber set-top box;

S717: Upon receipt of the multimedia service playing parameter, the set-top box prepares resources and adjusts status to receive the multimedia service broadcast by the service server and present the multimedia service to the subscriber;

Then the flow of the multimedia service process controlling part will be explained in detail. The multimedia service process control is directed to such control operations of the subscriber as quick forward, quick backward, pause, stop, and one-keying-to-the-end of the service during the process of broadcasting the multimedia service. The interactive flow is as shown in FIG. 7, and mainly includes, subsequent to steps S701-S717, the following steps of:

S718: The subscriber sends the multimedia service process control request to the multimedia service control request access subsystem via a terminal during the process of broadcasting the multimedia service;

S719: The multimedia service control request access subsystem sends the subscriber multimedia service process control request to the service location register;

S720: The service location register obtains the multimedia service control information from the request, and obtains the service control proxy that has already provided service to the subscriber multimedia service from the scheduling information according to the subscriber and the multimedia service information;

S721: The service location register sends the multimedia service process control request information and the subscriber multimedia service identification packaging message to the service control proxy determined in the previous step;

S722: The service control proxy obtains the instance of service control proxy of the current multimedia service according to the multimedia service key requested for control, and transmits the multimedia service process control request to the instance of service control proxy;

S723: The instance of service control proxy sends the multimedia service process control request to the service server, the service server returns the processing result of the current multimedia service process control request to the instance of service control proxy after successful processing, and the instance of service control proxy notifies the subscriber via the multimedia service control request access subsystem;

S724: The service server performs control operation on the multimedia service according to the multimedia service process control request, and returns the control result to the instance of service control proxy;

S725: A timer in the instance of service control proxy triggers, by timing, the multimedia service status report processing to report the multimedia service status to the interactive EPG;

S726: The interactive EPG converts the multimedia service status and locates the service middleware that provides the multimedia service to report the multimedia service status to the service middleware; and S727: The timer in the instance of service control proxy triggers, by timing, to send a heartbeat message to the service server, and the service server holds provision of the multimedia service to the subscriber according to the received heartbeat message.

Then the end control of the multimedia service will be explained in detail. Ending of the multimedia service mainly includes subscriber voluntary termination and multimedia service normal termination, which are respectively described as follows:

1) Subscriber Voluntarily Terminates the Multimedia Service

Figure 8:
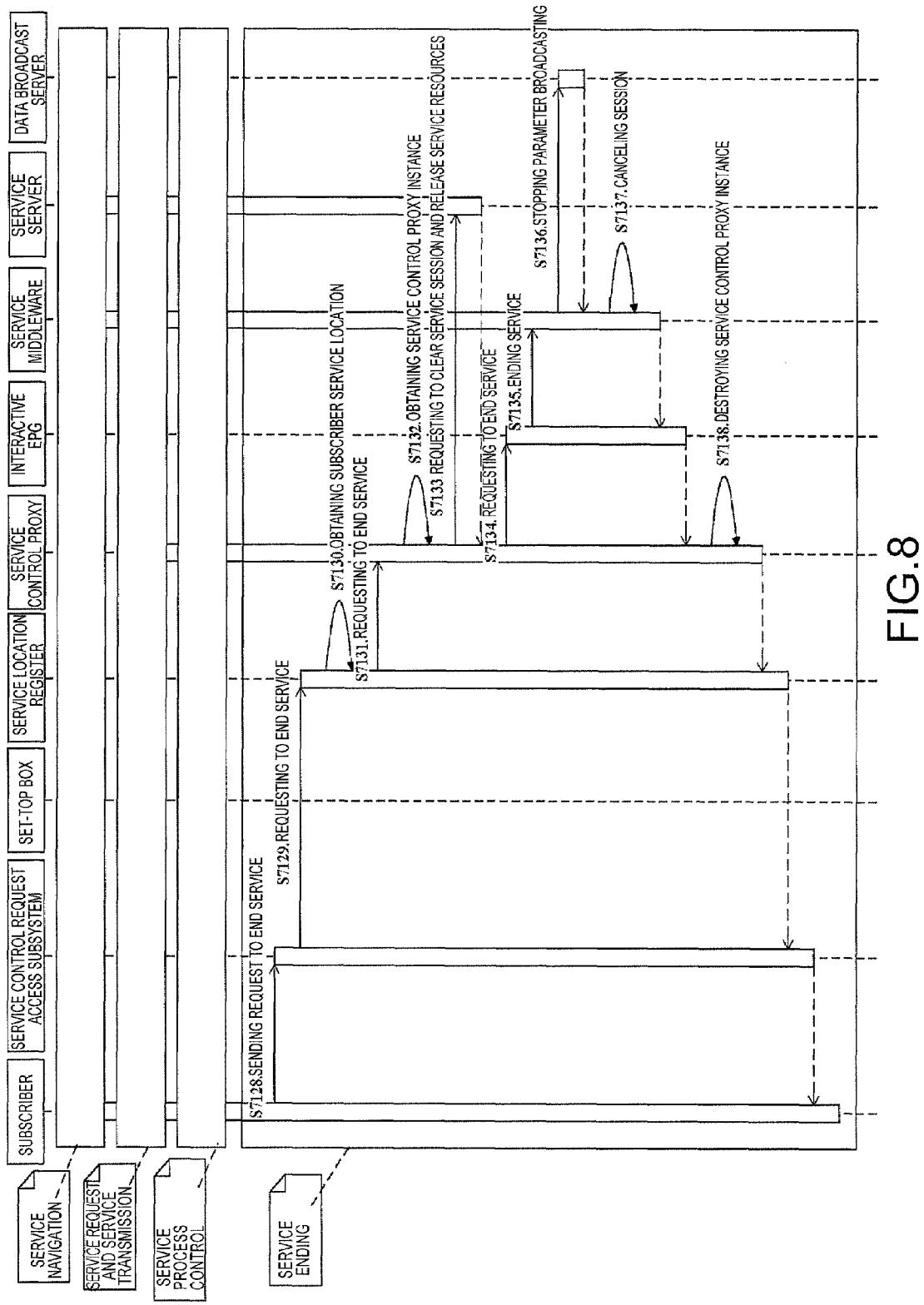
FIG. 8 is a schematic flowchart exemplarily illustrating control for a subscriber to forwardly stop the multimedia service during the process of broadcasting the multimedia service according to an embodiment of the present invention.

As shown in FIG. 8, when the subscriber voluntarily terminates the multimedia service due to various causes during the process of broadcasting the multimedia service, the main processing process includes steps as follows.

S7128: The subscriber sends a multimedia service ending request to the service control request access subsystem via a terminal during the process of broadcasting the multimedia service;

S7129: The service control request access subsystem sends the subscriber multimedia service ending request to the service location register;

S7130: The service location register obtains the multimedia service information requested to be ended from the multimedia service ending request, and obtains the service control proxy that has already provided service to the subscriber multimedia service from the scheduling information according to the subscriber and the multimedia service information;

S7131: The service location register sends the information requesting to end the multimedia service and the subscriber multimedia service identification packaging message to the service control proxy determined in the previous step;

S7132: The service control proxy obtains the instance of service control proxy of the current multimedia service according to the multimedia service key requested for control, and sends the multimedia service ending request to the instance of service control proxy;

S7133: The instance of service control proxy instructs the service server to end the multimedia service, and the service server clears the multimedia service session and releases the already assigned resources;

S7134: The instance of service control proxy instructs the interactive EPG to end the multimedia service;

S7135: The interactive EPG locates the service middleware that provides the multimedia service to instruct the service middleware to end the multimedia service;

S7136: The service middleware instructs the data broadcast server to stop broadcasting the multimedia service playing parameter, and the data broadcasting server stops broadcasting the multimedia service playing parameter to the subscriber set-top box;

S7137: The service middleware cancels the multimedia service management session, releases the resources, and returns the processing result layer by layer to the instance of service control proxy; and S7138: The service control proxy destroys the instance of service control proxy used for processing the current subscriber multimedia service control, returns the processing result of the current request to end the multimedia service after successful processing, and finally notifies the subscriber via the service control request access subsystem.

2) Service Normally Terminates

Figure 9:
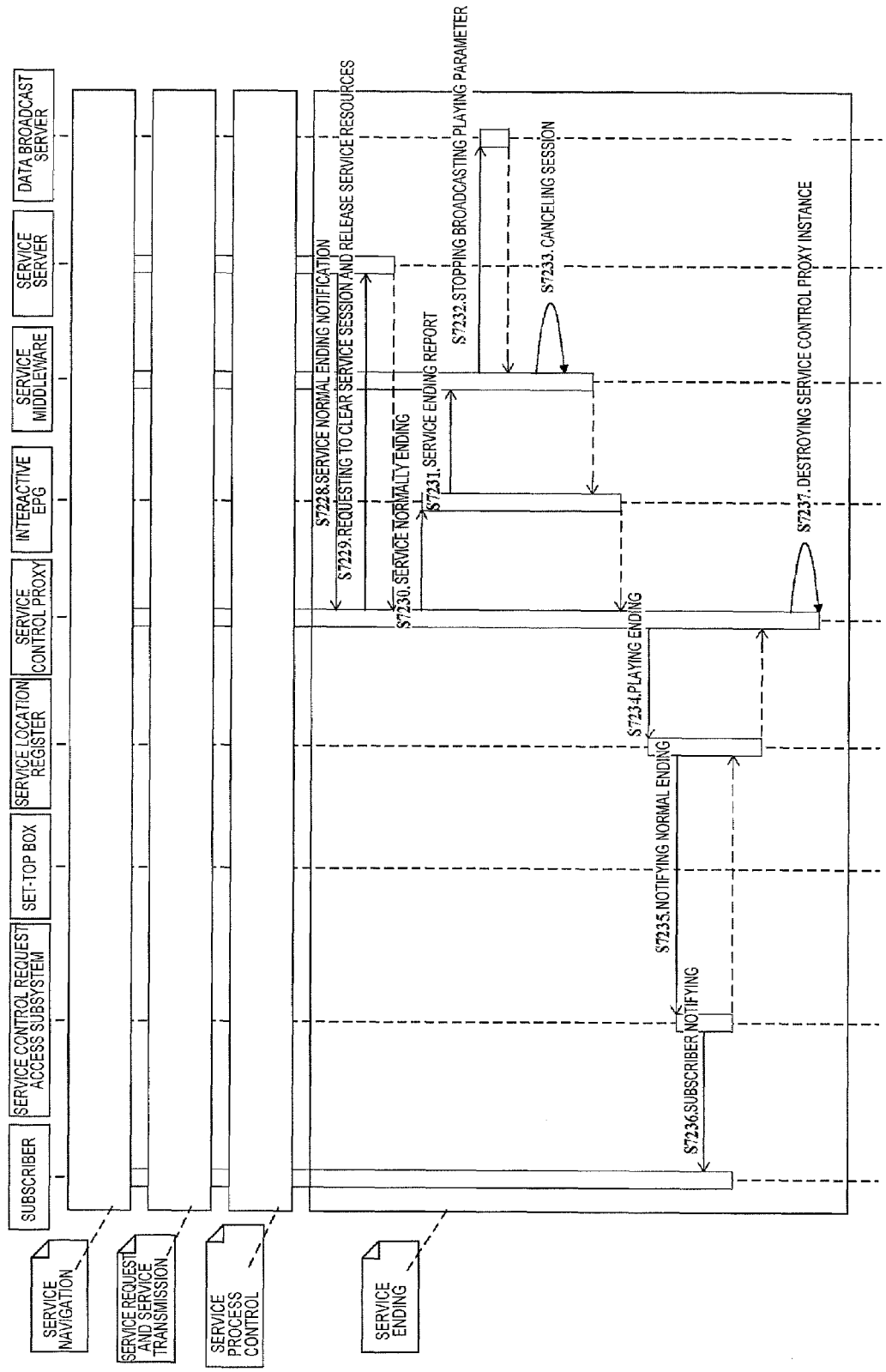
FIG. 9 is a schematic flowchart exemplarily illustrating control of automatically completing the multimedia service according to an embodiment of the present invention.

When the subscriber does not voluntarily terminate the multimedia service during the whole process of the multimedia service and the multimedia service normally terminates, the service server closes the multimedia service and notifies the service middleware of the ending of the multimedia service, and the service middleware instructs the service server to release the multimedia service resources and then to cancel the session. The detailed processing is as shown in FIG. 9 to mainly include the following steps of:

S7228: When the multimedia service normally terminates, the service server sends a multimedia service normal ending notification message to the instance of service control proxy;

S7229: The instance of service control proxy instructs the service server to terminate the multimedia service, and the service server clears the multimedia service session and releases the already assigned resources;

S7230: The instance of service control proxy instructs the interactive EPG to end the multimedia service;

S7231: The interactive EPG locates the service middleware that provides the multimedia service to instruct the service middleware to end the multimedia service;

S7232: The service middleware instructs the data broadcast server to stop broadcasting the multimedia service playing parameter, and the data broadcast server stops broadcasting the multimedia service playing parameter to the subscriber set-top box;

S7233: The service middleware cancels the multimedia service management session, releases the resources, and returns the processing result layer by layer to the instance of service control proxy;

S7234: The service control proxy notifies the service location register of the multimedia service ending message;

S7235: The service location register notifies the corresponding service control request access subsystem of the multimedia service ending information according to the service control request access subsystem from which the multimedia service control request comes, and destroys the scheduling relationship of the current subscriber multimedia service;

S7236: The service control request access subsystem notifies the subscriber of the multimedia service ending information; and S7237: The service control proxy destroys the instance of service control proxy used for processing the current subscriber multimedia service control.

By using the service location register and the service control proxy to form the system for and method of realizing the multimedia service, embodiments of the present invention unify the control flows of a multiplicity of multimedia services, satisfy the requirements of cooperative operation of the multiplicity of multimedia services, enhance the level of reuse of the control flows of the multimedia services, quicken the speed of response to the requirements of novel multimedia services, and improve the interactive experience of the multimedia services to certain degrees due to the unification of the control flows as well as the unification of prompts of the subscriber during the process of interaction.

Moreover, according to the system for and method of realizing the multimedia service according to the embodiments of the present invention, the second part of the multimedia service in the existing bidirectional network is also carried out via interaction between the service control proxy and the service server, and interaction between the service control proxy and the interactive EPG realizes the necessary operation control and resource control on the multimedia service, thus effectively protecting the interests of each party concerned with the multimedia service and lowering the operation risks of the multimedia service in the case the service operator cooperates with the multimedia service provider or content provider to carry out operation of the multimedia service.

The service location register according to the embodiments of the present invention carries out dynamic scheduling of the multimedia service request, so as to facilitate differentiated operations of the multimedia service, effectively reduce the influence of single-point failure in the service server, satisfy the requirements of continuous online update and expansion of the multimedia service, and hence enhance the reliability of operation of the multimedia service to certain degrees. Moreover, completion of authentication of the subscriber multimedia service control request in the service location register effectively controls the influence of malicious attacks on the multimedia service, and hence enhances the safety of operation of the multimedia service to certain degrees.

The service control proxy according to the embodiments of the present invention effectively reduces the influences of the application environments (such as the type of the network and the configuration of the set-top box, etc.) and the inherent characteristics of the multimedia services (such as the types and forms of expression of the multimedia services) on the operation of the multimedia service.

As can be clearly known to persons skilled in the art through the above descriptions of the embodiments, the present invention can be carried out with the aid of software with the indispensable general hardware platform, and can of course be carried out alone by hardware. Based on such understanding, the technical solution of the present invention or the part of the invention that makes contribution to the state of the art can be essentially embodied in the form of a software product. Such a computer software product can be stored in a storage medium, such as an ROM/RAM, a magnetic disk, or an optical disk etc., and includes a multiplicity of instructions enabling a computer device (which can be a personal computer, a server, or a network device, and so on) to execute the methods as recited in the various embodiments or certain sections of the embodiments of the present invention.

Obviously, it is possible for those ordinarily skilled in the art to make various variations and modifications without departing from the principles and scopes of the present invention, and all such variations and modifications should be regarded as also covered by the present invention if they fall within the scope as defined in the claims of the present invention or equivalent technologies thereof.

What is claimed is:

1. A system for realizing a multimedia service, comprising a service control request access subsystem, a service location register, a service middleware, a service control proxy, an interactive electronic program guide, EPG, and a service server, wherein
    the service middleware is configured to receive multimedia service location information updated by a subscriber, multimedia service scheduling policy of the service control proxy and device maintenance information of the service control proxy, to load them respectively to the service location register, and to start up or stop the corresponding service control proxy according to the device maintenance information of the service control proxy;
    the service control request access subsystem is configured to receive a subscriber multimedia service control request and forward the request to the service location register;
    the service location register is configured to authenticate the subscriber multimedia service control request according to the multimedia service location information, to determine
    the service control proxy for a subscriber having passed the authentication, according to the multimedia service scheduling policy, and to forward the subscriber multimedia service control request to the determined service control proxy; and
    the service control proxy is configured to perform multimedia service interaction control with the interactive EPG and to perform multimedia service control with the service server according to the subscriber multimedia service control request.

2. The system according to claim 1, wherein the service middleware comprises:
    a subscriber service location management module, configured to receive a request from a subscriber for updating the multimedia service location information, and to load the multimedia service location information updated by the subscriber to the service location register;
    a service scheduling policy management module, configured to receive multimedia service scheduling policy of the service control proxy input by a system manager, and to load the multimedia service scheduling policy to the service location register; and
    a service control proxy management module, configured to receive device maintenance information of the service control proxy input by a system manager, to start up or stop the corresponding service control proxy according to the device maintenance information, and to load the device maintenance information multimedia service of the service control proxy to the service location register.

3. The system according to claim 1, wherein the service location register comprises:
    a service location register communicating unit, configured to realize communication with the service control request access subsystem, the service middleware and the service control proxy, respectively;
    a service location information storing unit, configured to store the subscriber multimedia service location information received by the service location register communicating unit from the service middleware;
    a service control request authenticating unit, configured to authenticate the subscriber multimedia service control request forwarded by the service control request access subsystem according to the subscriber multimedia service location information stored in the service location information storing unit;
    a service scheduling policy storing unit, configured to store the multimedia service scheduling policy received by the service location register communicating unit from the service middleware; and
    a service control proxy selecting unit, configured to determine the service control proxy for the subscriber having passed the authentication, according to the multimedia service scheduling policy stored in the service scheduling policy storing unit, and to forward the subscriber multimedia service control request to the determined service control proxy via the service location register communicating unit.

4. The system according to claim 1, wherein the service control proxy comprises:
    a service control proxy communicating unit, configured to communicate respectively with the service location register, the service middleware, the service server, and the interactive EPG;
    an operation controlling unit, configured to start up or stop the service control proxy according to a control command received by the service control proxy communicating unit from the service middleware; and
    a service controlling unit, configured to perform multimedia service interaction control with the interactive EPG and to perform multimedia service control with the service server via the service control proxy communicating unit, according to the subscriber multimedia service control request received by the service control proxy communicating unit from the service location register.

5. The system according to claim 1, wherein the service control request access subsystem comprises a set-top box and a Web server, wherein
    the set-top box is configured to receive the subscriber multimedia service control request and to forward the request to the Web server; and
    the Web server is configured to forward the subscriber multimedia service control request to the service location register.

6. The system according to claim 1, wherein the service control request access subsystem comprises a subscriber terminal device and a network access device, wherein
    the subscriber terminal device is configured to receive the subscriber multimedia service control request and to forward the request to the network access device; and
    the network access device is configured to forward the subscriber multimedia service control request to the service location register.

7. A service location register, comprising:
  a service location register communicating unit, configured to realize communication with a service middleware, a service control request access subsystem, and a service control proxy, respectively;
  a service location information storing unit, configured to store subscriber multimedia service location received by the service location register communicating unit from the service middleware;
  a service control request authenticating unit, configured to authenticate the subscriber multimedia service control request forwarded by the service control request access subsystem according to the subscriber multimedia service location information stored in the service location information storing unit;
  a service scheduling policy storing unit, configured to store multimedia service scheduling policy received by the service location register communicating unit from the service middleware; and
  a service control proxy selecting unit, configured to determine a service control proxy for a subscriber having passed the authentication, according to the multimedia service scheduling policy stored in the service scheduling policy storing unit, and to forward the subscriber multimedia service control request to the determined service control proxy via the service location register communicating unit.

8. A method of controlling a multimedia service, comprising:
  receiving, by a service location register, a subscriber multimedia service control request;
  authenticating, by the service location register, the multimedia service control request according to subscriber multimedia service location information;
  determining, by the service location register, a service control proxy for a subscriber having passed the authentication, according to multimedia service scheduling policy of the service control proxy, and forwarding the multimedia service control request to the service control proxy; and
  performing multimedia service interaction control with an interactive electronic program guide, EPG and performing multimedia service control with a service server by the service control proxy according to the multimedia service control request, wherein performing multimedia service interaction control with an interactive EPG by the service control proxy specifically comprises:
  creating, by the service middleware, a session for a subscriber according to the multimedia service control request, and requesting the service server for assignment of service resources;
  performing, by the service server, resource scheduling, and sending a multimedia service playing parameter to the service middleware; and
  starting up, by the service middleware, a session overtime monitor to monitor status of the session, and sending the multimedia service playing parameter to the service control proxy via the interactive EPG.

9. The method according to claim 8, wherein performing multimedia service control with the service server by the service control proxy specifically comprises:
  sending, by the service control proxy, a multimedia service playing parameter to a data broadcast server, and the data broadcast server broadcasting the multimedia service playing parameter to the subscriber;
  sending, by the service control proxy, the multimedia service control request to the service server, and transmitting, by the service server, the multimedia service requested by the subscriber to a subscriber set-top box; and
  receiving, by the subscriber set-top box, the multimedia service transmitted from the service server according to the received multimedia service playing parameter.

10. The method according to claim 8, wherein loading the subscriber multimedia service location information to the service location register comprises:
  receiving, by the service middleware, multimedia service location information changed by the subscriber and submitting the information to the service location register; and
  loading, by the service location register, the multimedia service location information changed by the subscriber.

11. The method according to claim 8, wherein loading the multimedia service scheduling policy to the service location register comprises:
  receiving, by the service middleware, the multimedia service scheduling policy and submitting the policy to the service location register; and
  loading, by the service location register, the multimedia service scheduling policy.

12. The method according to claim 8, further comprising:
  receiving, by the service middleware, a device information maintenance request from the service control proxy;
  starting up or stopping, by the service middleware, the corresponding service control proxy according to the maintenance information of the service control proxy, and submitting the maintenance information of the service control proxy to the service location register; and
  loading, by the service location register, the maintenance information of the service control proxy.

13. The method according to claim 8, further comprising:
when the subscriber sends a multimedia service process control request to a multimedia service process control request access subsystem during the process of transmitting the multimedia service:
  sending, by the multimedia service process control request access subsystem, the subscriber multimedia service process control request to the service location register;
  forwarding, by the service location register, the subscriber multimedia service process control request to the service control proxy that provides service to the subscriber multimedia service;
  sending, by the service control proxy, the multimedia service process control request to the service server; and
  performing, by the service server, control operation on the multimedia service according to the multimedia service process control request.

14. The method according to claim 8, further comprising:
  triggering, by the service control proxy, by timing multimedia service status report processing to report multimedia service status to the interactive EPG, and reporting, by the interactive EPG, the multimedia service status to the service middleware that provides the multimedia service; and
  triggering, by the service control proxy, by timing to send a heartbeat message to the service server, and holding, by the service server, the multimedia service of the subscriber according to the heartbeat message.

15. The method according to claim 8, further comprising:
when the subscriber sends a request to stop the multimedia service to the multimedia service process control request access subsystem during the process of transmitting the multimedia service:

sending, by the service control request access subsystem, the subscriber multimedia service stop request to the service location register;

forwarding, by the service location register, the multimedia service stop request to the service control proxy that provides service to the subscriber multimedia service;

sending, by the service control proxy, the request to stop the multimedia service to the service server, and clearing, by the service server, the multimedia service session and releasing the assigned resources; and requesting, by the service control proxy, the interactive EPG to stop the subscriber multimedia service, instructing, by the interactive EPG, the service middleware to stop the subscriber multimedia service, and instructing, by the service middleware, the data broadcast server to stop broadcasting the multimedia service playing parameter, canceling multimedia service management session, and releasing the resources.

16. The method according to claim 8, further comprising: when the subscriber multimedia service normally completes:

sending, by the service server, a multimedia service normal completion notifying message to the service control proxy when the multimedia service normally completes;

sending, by the service control proxy, a request to stop the multimedia service to the service server, clearing, by the service server, the multimedia service session and releasing the assigned resources, requesting, by the service control proxy, the interactive EPG to stop the multimedia service, instructing, by the interactive EPG, the service middleware to stop the multimedia service, and instructing, by the service middleware, the data broadcast server to stop broadcasting the multimedia service playing parameter, canceling multimedia service management session, and releasing the resources; and notifying, by the service control proxy, the service location register of a multimedia service completion message, the service location register notifying the service control request access subsystem of the multimedia service completion message.

* * * * *